United States Patent [19]

Van den Brink et al.

[11] 4,217,559
[45] Aug. 12, 1980

[54] METHOD OF ADJUSTING GAS LASER MIRROR

[75] Inventors: Hans G. Van den Brink, Eindhoven; Albertus J. F. M. Van Hoof, Weert; Johannes H. K. C. Van Kleef; Theodorus F. Lamboo, both of Eindhoven, all of Netherlands

[73] Assignee: U.S. Philips Corporation, New York, N.Y.

[21] Appl. No.: 825,576

[22] Filed: Aug. 18, 1977

[30] Foreign Application Priority Data

Apr. 5, 1977 [NL] Netherlands .......................... 7703686

[51] Int. Cl.² .............................................. H01S 3/086
[52] U.S. Cl. ........................... 331/94.5 C; 331/94.5 D
[58] Field of Search ...................... 331/94.5 C, 94.5 D; 29/593

[56] References Cited

U.S. PATENT DOCUMENTS

| | | | |
|---|---|---|---|
| 3,826,998 | 7/1974 | Kindl et al. | 331/94.5 C |
| 3,851,275 | 11/1974 | Furnse et al. | 331/94.5 D |
| 3,978,425 | 8/1976 | Knowles | 331/94.5 C |
| 3,988,698 | 10/1976 | Crane et al. | 331/94.5 D |

Primary Examiner—William D. Larkins
Attorney, Agent, or Firm—Thomas A. Briody; William J. Streeter; Bernard Franzblau

[57] ABSTRACT

A method of adjusting an optical element of a gas discharge laser, which element is provided at one end of a tubular metal support with the support in turn secured to the laser tube, by drawing a tubular section of the support beyond the yield point of the metal of which the tubular section consists during or after adjustment of the optical element by deformation of the tubular section throughout the circumference. An accurate adjustment of the element thereby takes place in a simple manner in which no stresses remain in the material which might otherwise maladjust the laser. The tubular section preferably consists of copper or nickel.

1 Claim, 5 Drawing Figures

METHOD OF ADJUSTING GAS LASER MIRROR

The invention relates to a method of adjusting an optical element of a gas discharge laser, which element is mounted at one end of a tubular metal support that is in turn secured to the laser tube and which optical element is adjusted by mechanical deformation of the support.

The invention also relates to a gas discharge laser having an optical element adjusted according to said method.

Such a method and gas discharge laser are known from Netherlands Patent Application No. 7515006 which has been laid open to public inspection and in which the support is fixed to a metal plate which is provided with an aperture situated on the axis of the tubular support, which metal plate seals one end of the discharge tube. The support comprises a zone having a smaller wall thickness which can be plastically deformed constantly from without by applying a tool.

Such a method and plastically deformable mirror mount are also disclosed in U.S. Pat. No. 3,826,998. The adjustment is carried out by inserting a tool, for example a screwdriver, in a slot in the support, which slot forms a weak deformable place, and tilting the support in a manner such that the laser mirror is adjusted after recoil. This method of adjusting is difficult because after the deformation, when the amount of tilt moment (screwdriver) is removed, the support recoils partly. The tilting which is necessary to reach the desired final position after recoil is so large that the laser resonator will be fully maladjusted during said tilting. In addition, asymmetrical stresses appear to remain in the material deformed in this manner, which stresses give rise to maladjustment of the gas discharge laser during its life.

It is an object of the invention to provide a method of adjusting an optical element of a laser in which no recoil from the adjusted direction takes place and the optical element remains in its adjusted position, and wherein no stresses which may give rise to maladjustment remain in the deformed material.

According to the invention, a method of the kind mentioned in the preamble is characterized in that, during or after adjusting by deformation of a section of the tubular metal support, the tube section is drawn beyond the yield point of the metal of which the section consists throughout the circumference of the tube. Since the metal of the whole circumference of the tube is drawn beyond the yield point, the support with the optical element will no longer recoil from the adjusted direction. It does recoil in the opposite direction to which it was drawn, which direction coincides with the direction of the longitudinal axis of the laser. In addition, after this method of adjusting, no stresses are present in the material which might give rise afterwards to maladjustment of the laser.

The support or at least the section of the tube is preferably manufactured from a ductile metal, preferably copper or nickel.

The tube section preferably has a smaller wall thickness than the remainder of the support because it can then easily be drawn beyond the yield point.

The invention will now be described in greater detail with reference to the accompanying drawing, in which.

Figure 1:
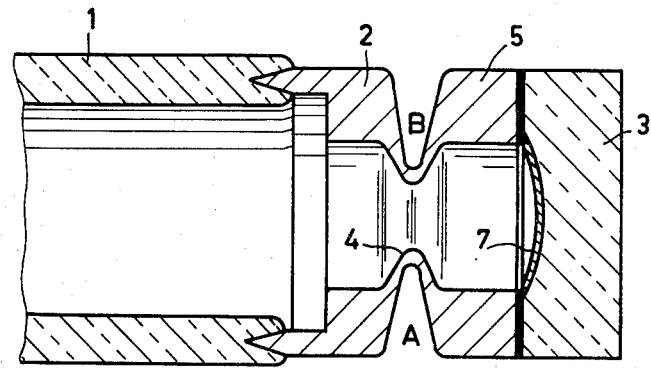
FIG. 1 is a diagrammatic sectional view of a prior art support.

FIG. 1 shows one end of a gas laser tube as described in the said U.S. Pat. No. 3,826,998. The quartz tube 1 has a metal support 2 for the laser mirror 3 which is provided with a multilayer mirror 7. The support 2 has a constriction 4 which forms a deformable portion. The laser mirror 3 is secured to the support, for example, by means of an adhesive, a sealing glass or an enamel. Until now the mirror 3 was adjusted, for example, by inserting a screwdriver on one side in the constriction 4, after which the constriction 4 is deformed mechanically, the part 5 of the support 2 being tilted. During the adjustment the laser output power can be optimized. Alternatively, the adjustment is possible by means of a light beam, preferably a light beam of another laser which is caused to pass through the laser to be adjusted. These above-described methods of adjustment, however, are cumbersome. As a matter of fact, the insertion of a screwdriver into part A of the constriction 4 will only produce plastic deformation of the material of the support in said part A. In part B the material will only be deformed elastically. This is expressed in the recoil of part 5 from the adjusted direction of the support after tilting. Tilting until the maximum output power of the laser has been achieved is thus not sufficient because, as a result of the elastic deformation, part 5 will recoil and the maximum output power will no longer be reached.

Figure 2:
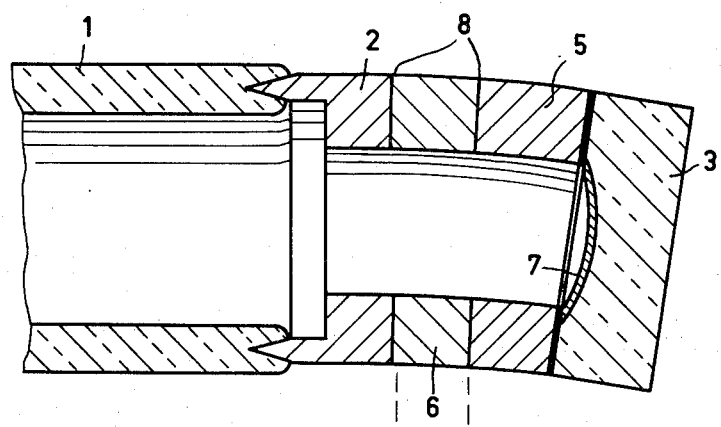
FIGS. 2 and 3 are diagrammatic sectional views of supports according to the invention to explain the method according to the invention.
Figure 3:
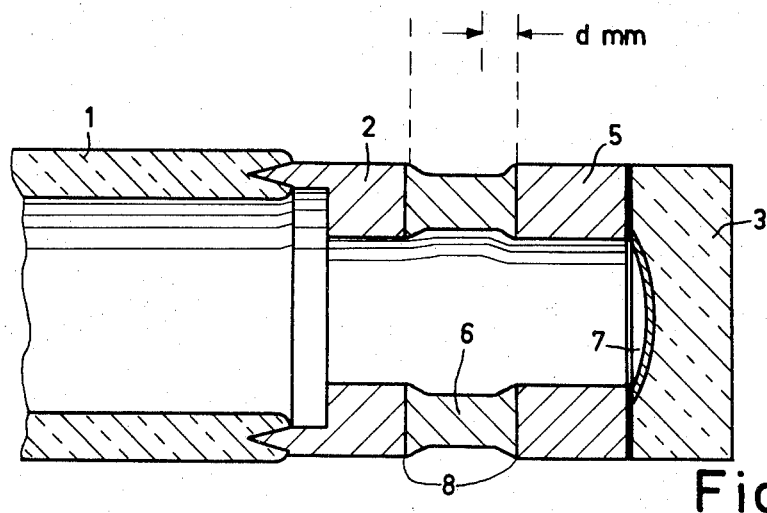

The method according to the invention will be described with reference to FIGS. 2 and 3. FIG. 2 shows, on an enlarged scale, a non-adjusted laser mirror. The support 2 comprises a tubular section 6 which consists of copper and which is sealed to the other parts of the support by means of a seal 8. Instead of tilting only part 5 of the support 2, the whole tubular section 6 is drawn beyond the yield point of the copper during or after tilting (the adjustment). The result is shown in FIG. 3. The tubular section 6 has become longer and also slightly thinner as a result of the drawing. As a result of the drawing beyond the yield point during or after tilting, part 5 of the support does no longer recoil (at least not from the adjusted direction) and after the adjustment no stresses are present in the material of the support any longer.

This method of adjustment can of course also be used in coaxial lasers, as described in Netherlands Patent Application No. 7,515,006 which has been laid open to public inspection and in which the support is not secured to the laser tube but to a metal plate. In the prior art the design of the support is essential to enable the tilting. In the present invention the choice of the material and the drawing beyond the yield point of the whole tubular section is the idea underlying the invention. It may be necessary, dependent on the material of the tubular section, to give the tubular section a smaller wall thickness so as to be able to arrive beyond the yield point during drawing. Other optical elements in a laser, for example Brewster-windows, can also be adjusted in the manner of the invention.

Figure 4:
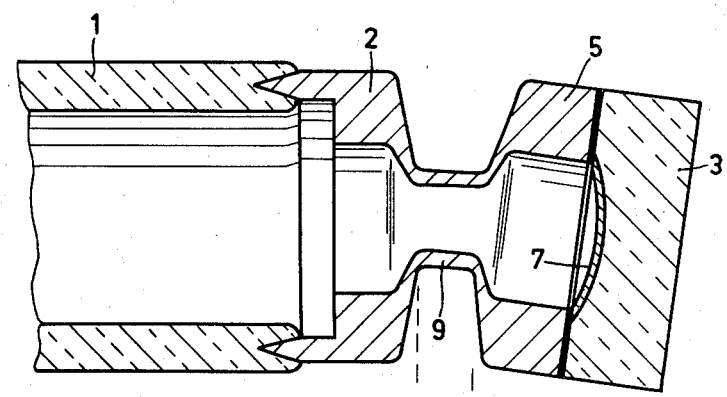
FIGS. 4 and 5 show another possibility of carrying out the method.

FIG. 4 shows a non-adjusted laser end in which the support 2 is manufactured entirely from copper. The tubular section 9, however, in this case has a smaller wall thickness than the remainder of the support 2 and can therefore be drawn easily beyond the yield point and be adjusted.

Figure 5:
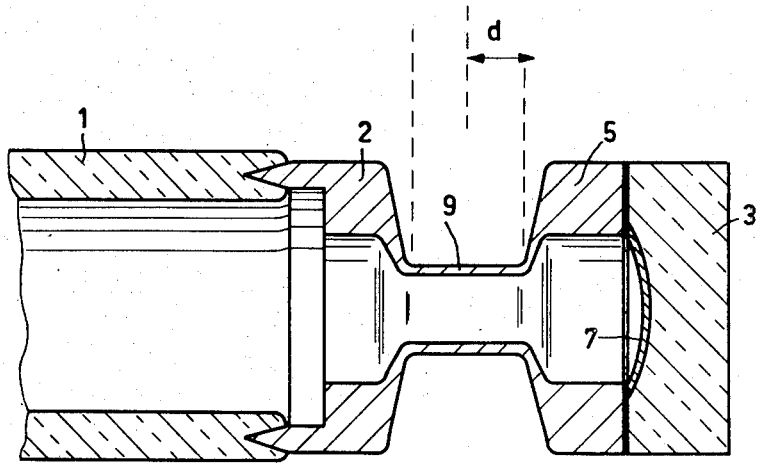

FIG. 5 shows the adjusted position. The ductile tubular section 9 has become slightly longer and thinner. After the adjusting and drawing process, part 5 recoils only in the direction of the longitudinal axis of the laser. The adjusted angle is maintained and no stresses are present in the material.

What is claimed is:

1. A method of adjusting an optical element of a gas discharge laser, which element is secured to one end of a tubular metal support with the support in turn secured to the laser tube, which comprises adjusting the optical element by mechanical deformation of a tubular section of the tubular metal support, and drawing the tubular section beyond the yield point of the metal of the tubular section throughout the circumference during or after adjustment of the optical element.

* * * * *